US011194243B2

(12) United States Patent
Wang et al.

(10) Patent No.: US 11,194,243 B2
(45) Date of Patent: Dec. 7, 2021

(54) PROJECTION SCREEN AND PROJECTION SYSTEM

(71) Applicant: Appotronics Corporation Limited, Shenzhen (CN)

(72) Inventors: Lin Wang, Shenzhen (CN); Wei Sun, Shenzhen (CN); Fei Hu, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 15/733,857

(22) PCT Filed: Jan. 5, 2019

(86) PCT No.: PCT/CN2019/070529
§ 371 (c)(1),
(2) Date: Nov. 30, 2020

(87) PCT Pub. No.: WO2019/227935
PCT Pub. Date: Dec. 5, 2019

(65) Prior Publication Data
US 2021/0223675 A1 Jul. 22, 2021

(30) Foreign Application Priority Data
May 31, 2018 (CN) .......................... 201810547434.1

(51) Int. Cl.
*G03B 21/602* (2014.01)
*G03B 21/60* (2014.01)

(52) U.S. Cl.
CPC ........... *G03B 21/602* (2013.01); *G03B 21/60* (2013.01)

(58) Field of Classification Search
CPC ...... G03B 21/60; G03B 21/602; G02B 5/124; G02B 5/136
USPC .................................................. 359/449, 459
See application file for complete search history.

(56) References Cited

U.S. PATENT DOCUMENTS

| 1,528,533 | A | * | 3/1925 | Davis | G03B 21/60 359/459 |
|---|---|---|---|---|---|
| 3,408,132 | A | * | 10/1968 | Chandler | G03B 21/60 359/451 |
| 7,835,078 | B2 | * | 11/2010 | Ichikawa | G03B 21/60 359/443 |
| 2004/0240054 | A1 | * | 12/2004 | Aiura | G03B 21/56 359/455 |
| 2008/0304150 | A1 | | 12/2008 | Yamauchi | |

(Continued)

FOREIGN PATENT DOCUMENTS

| CN | 101256343 A | 9/2008 |
|---|---|---|
| CN | 207216263 U | 4/2018 |
| JP | 2006106393 | 4/2006 |

*Primary Examiner* — Christopher E Mahoney
(74) *Attorney, Agent, or Firm* — ScienBiziP, P.C.

(57) ABSTRACT

Provided is a projection screen, comprising a substrate (10), a total reflection layer (20), and a light absorbing layer (30) for absorbing light rays, which are sequentially arranged from a light incident side, wherein the total reflection layer (20) is provided with a plurality of trapezoidal microstructures extending in the vertical direction of the projection screen, and the plurality of trapezoidal micro-structures is periodically arranged in the horizontal direction of the projection screen. The projection screen has the characteristics of simple structure, easy processing, low cost and high contrast.

20 Claims, 6 Drawing Sheets

(56) References Cited

U.S. PATENT DOCUMENTS

2010/0103514 A1\* 4/2010 Chou ..................... G03B 21/56  
                                                                                       359/449  
2014/0022511 A1\* 1/2014 Kuo ....................... G02B 30/00  
                                                                                       353/10

\* cited by examiner

PROJECTION SCREEN AND PROJECTION SYSTEM

TECHNICAL FIELD

The disclosure relates to a projection screen and a projection system including the projection screen.

BACKGROUND

In a projection display system, a screen is an important factor affecting its performance, and especially has a significant effect on image quality of projection display. For a screen, its contrast is an important parameter to evaluate the quality of the screen.

In related arts, due to ambient light, the contrast of the image reflected by the screen is much lower than the contrast of the projector itself. This is because the projection screens in the related arts reflect light from both the projector and the ambient light.

To improve the contrast of the screen in the presence of ambient light, current anti-ambient light projection screens usually use wire grid screens, which increase the contrast of ambient light by providing a surface for absorbing light and another surface for reflecting light. However, such screen has a relatively low gain. Another kind of anti-ambient light projection screens are realized by an micro-structures array plus a light reflection layer or a light absorbing layer. However, in this structure, ambient light at some angles can still be reflected toward the viewer side, thus effect of improving the contrast is limited.

SUMMARY

To solve the above technical problems, the present disclosure proposes a projection screen for a far focus projector. The projection screen has characteristics of simple structure, easy processing, low cost, and high contrast.

An embodiment of the present disclosure discloses a projection screen, which includes a substrate, a total internal reflection layer, and a light absorbing layer for absorbing light, which are sequentially arranged in said order from a light incident side, wherein the total internal reflection layer includes a plurality of trapezoidal micro-structures extending in a vertical direction of the projection screen, and the plurality of trapezoidal micro-structures is periodically arranged in a horizontal direction of the projection screen.

The projection screen of the present disclosure includes the total internal reflection layer and a diffusion layer. Projection light from the far focus projector returns to the viewer side in a form of cross after being totally internally reflected by the total internal reflection layer, thereby expanding a horizontal viewing angle. In addition, the diffusion layer can further diffuse the viewing angle.

The total internal reflection layer in the projection screen of the present disclosure further has the trapezoidal micro-structures. Each of the trapezoidal micro-structures includes two inclined surfaces and a horizontal surface in contact with a black light absorbing layer. Since the horizontal surface of each trapezoidal micro-structure is in contact with the black light absorbing layer, the ambient light incident on the horizontal surface is absorbed by the black light absorbing layer, and the ambient light incident on the inclined surfaces of each trapezoidal micro-structure is reflected to the horizontal surface and then also absorbed by the black light absorbing layer. Therefore, the projection screen of the present disclosure can sufficiently absorb ambient light, thereby obtaining a high-contrast image.

It should be understood that the beneficial effects of the present disclosure are not limited to the above-mentioned effects but may be any beneficial effects described herein.

DETAILED DESCRIPTION

Hereinafter, specific embodiments according to the present disclosure will be described in detail with reference to the accompanying drawings. It should be emphasized that all dimensions in the drawings are only schematic and are not necessarily illustrated in true scale, so they are not limited. For example, it should be understood that the dimensions, proportions, and other parameters of components such as diffusion layers, total internal reflection layers, and black light absorbing layers in the figures are not shown according to the actual dimensions and proportions, and are only for convenience of illustration, but not for limiting the specific scope of the present disclosure.

Figure 1:
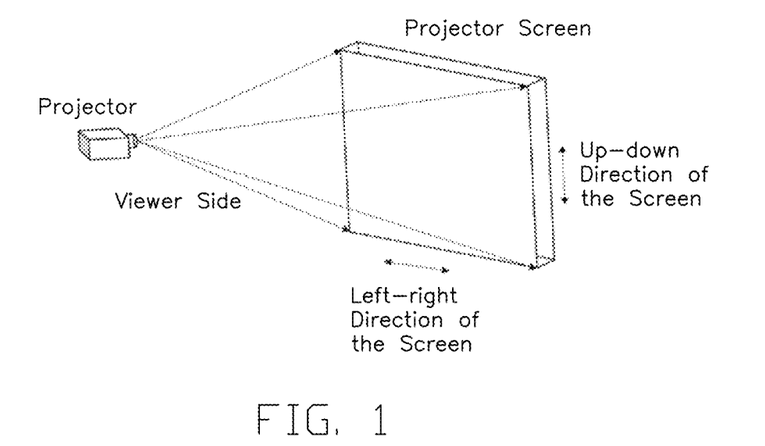
FIG. 1 is a perspective view showing a projection system comprising a projector and a projection screen.

In the following text, an exemplary structure of a projection screen in the present disclosure will be described first with reference to FIG. 1 through FIG. 4, wherein FIG. 1 shows a projection system comprising a projector and a projection screen. As shown in FIG. 1, relative to a viewer in front of the screen, a vertical direction of the projection screen is an up-down direction of the screen, and a horizontal direction of the projection screen is a left-right direction of the screen. The "up-down direction of the screen" and the "left-right direction of the screen" described in other figures of the present disclosure have the same meaning.

Figure 2:
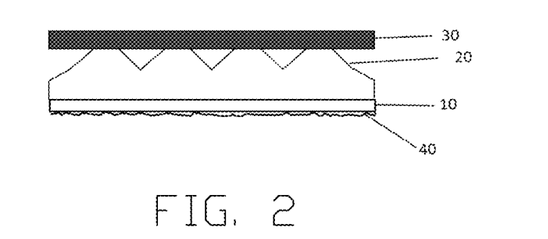
FIG. 2 is a schematic diagram showing a structure of the projection screen in the present disclosure.

FIG. 2 shows a structure of the projection screen in the present disclosure. As shown in FIG. 2, the projection screen includes a diffusion layer 40, a substrate 10, a total internal reflection layer 20, and a black light absorbing layer 30, which are sequentially arranged in said order from the viewer side (i.e., a light incident side). The diffusion layer 40 and the total internal reflection layer 20 are respectively formed on two sides of the substrate 10, and the black light absorbing layer 30 is formed to be in contact with the total internal reflection layer 20.

In the above structure, the diffusion layer 40 is configured to diffuse light emitted from the total internal reflection layer 20, and the black light absorbing layer 30 is configured to absorb light incident on the black light absorbing layer 30. The diffusion layer 40 and the black light absorbing layer 30 can adopt related technical structures in related arts, so it will not be repeated in the present disclosure. The substrate 10 may include organic materials such as PET (polyethylene terephthalate), PC (polycarbonate), PVC (polyvinyl chloride), PMMA (polymethyl methacrylate) or the like. The total internal reflection layer 20 in the projection screen will be described in detail below.

Figure 3:
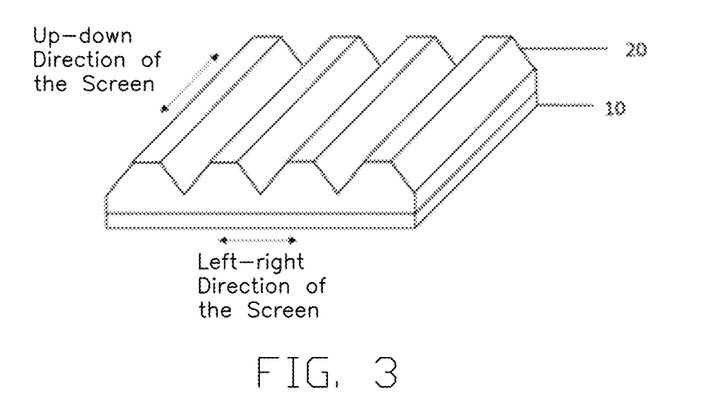
FIG. 3 is a perspective view showing a structure of a substrate and a total internal reflection layer in the present disclosure.
Figure 4:
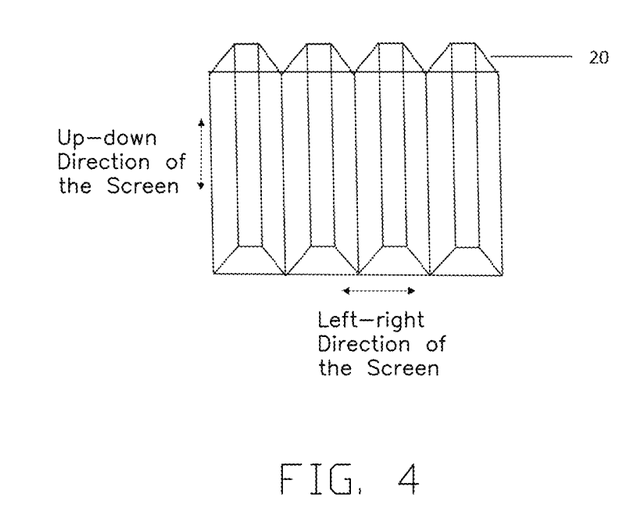
FIG. 4 is a top view showing the total internal reflection layer in the present disclosure.

FIG. 3 is a perspective view showing a structure of the substrate 10 and the total internal reflection layer 20 in the structure shown in FIG. 2. FIG. 4 is a top view showing the total internal reflection layer 20 in the structure shown in FIG. 2. As shown in FIG. 3 and FIG. 4, the total internal reflection layer 20 includes a plurality of trapezoidal micro-structures extending in the up-down direction of the screen. Each of the trapezoidal micro-structures includes two inclined surfaces with complementary angles and same length along the inclined direction and two horizontal surfaces (that is, an upper bottom surface and a lower bottom surface). The inclined surfaces and the horizontal surfaces form a trapezoidal micro-structure. Preferably, each of the trapezoidal micro-structures is an isosceles trapezoidal micro-structure, so that it is easier to control the reflected light. The plurality of trapezoidal micro-structures is periodically arranged in the left-right direction of the screen, thereby forming an isosceles trapezoidal micro-structure array serving as the total internal reflection layer 20.

In the present disclosure, the total internal reflection layer 20 may be formed by coating on a side of the substrate 10 opposite to the viewer side.

Since the isosceles trapezoidal micro-structures in the total internal reflection layer 20 are simple to process, the projection screen can be manufactured more easily.

As can be seen with reference to FIGS. 2 and 3, in the trapezoidal micro-structure of the total internal reflection layer 20, the horizontal surface with a shorter length in the left-right direction of the screen is adjacent to the black light absorbing layer 30.

In the projection screen shown in FIG. 2, the total internal reflection layer 20 and the diffusion layer 40 can be formed on both sides of the same transparent substrate 10 by a hot embossing method or a UV glue transfer method.

Although FIG. 2 shows the structure in which the total internal reflection layer 20 and the diffusion layer 40 are formed on opposite sides of the substrate 10, in the projection screen of the present disclosure, two surfaces on opposite sides of the substrate 10 may be formed into the total internal reflection layer 20 and the diffusion layer 40, respectively. That is, the substrate 10, the total internal reflection layer 20 and the diffusion layer 40 are integrated into one layer, instead of being formed by bonding three layers as shown in FIG. 2.

Figure 5:
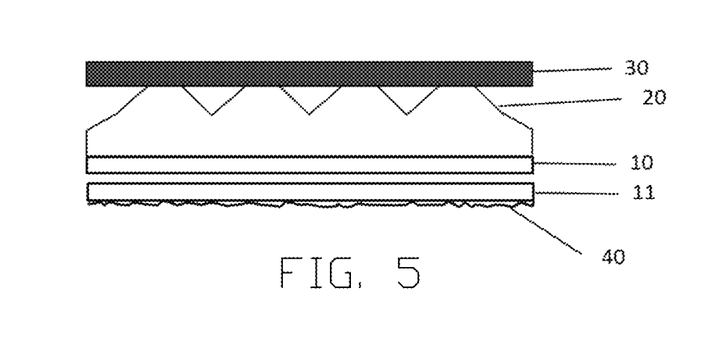
FIG. 5 shows a modified embodiment of the structure of the projection screen in the present disclosure.

FIG. 5 shows a modified embodiment of the structure of the projection screen in the present disclosure. Except for the following differences, other related features and descriptions in FIG. 5 (such as the trapezoidal micro-structures of the total internal reflection layer 20, and so on) are the same as those of the projection screen in FIG. 2, so they will not be repeated.

What is different from the structure of the projection screen in FIG. 2 is that the total internal reflection layer 20 and the diffusion layer 40 in FIG. 5 are respectively formed on two opposite sides of two substrates 10 and 11. That is, the total internal reflection layer 20 is formed on the substrate 10, and the diffusion layer 40 is formed on a side of the substrate 11 opposite to the side facing the substrate 10. In the structure of FIG. 5, the two facing surfaces of the substrates 10 and 11 are attached together.

In addition, although it is described in the description of FIG. 5 that the total internal reflection layer 20 is formed on one side of the substrate 10 and the diffusion layer 40 is formed on the side of the substrate 11 opposite to the side facing the substrate 10, it is also possible that one side of the substrate 10 is directly formed into the total internal reflection layer 20 and the other side of the substrate 11 is formed into the diffusion layer 40.

That is, the total internal reflection layer 20 and the substrate 10 are integrated into one layer, and the diffusion layer 40 and the substrate 11 are integrated into one layer. Then, the facing surfaces of the substrates 10 and 11 are attached together.

In this modified embodiment, the total internal reflection layer 20 and the diffusion layer 40 are respectively formed on the two substrates 10 and 11 by means of hot embossing or UV glue transfer.

Figure 6:
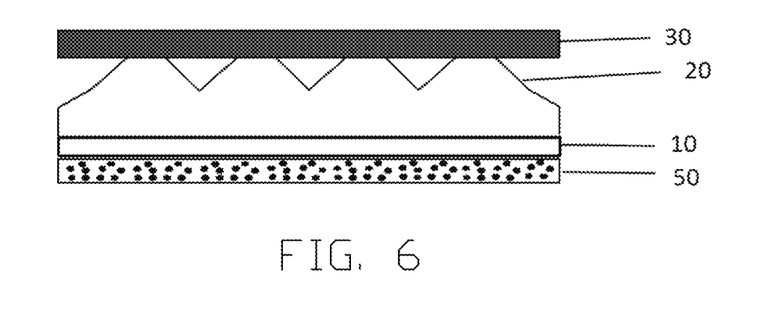
FIG. 6 shows another modified embodiment of the structure of the projection screen in the present disclosure.

FIG. 6 shows another modified embodiment of the structure of the projection screen in the present disclosure. Except for the following differences, other related features and descriptions in FIG. 6 (such as the trapezoidal micro-structures of the total internal reflection layer 20, and so on) are the same as those of the projection screen in FIG. 2, so they will not be repeated.

What is different from the structure of the projection screen in FIG. 2 is that a bulk diffusion film 50 formed of a bulk diffusion material is used in FIG. 6 to replace the diffusion layer 40 in FIG. 2, and then the bulk diffusion film 50 is bonded to the substrate 10 using a glue such as a thermosetting glue. The bulk diffusion film 50 can be a bulk diffusion film that has been widely used in commerce.

In addition, other layer structures such as a colored layer made of a dark color material, an anti-scratch protective layer, an anti-reflection layer, or the like, may be bonded to a side of the bulk diffusion film 50 opposite to the side to which the substrate 10 is bonded.

In addition, the projection screen of the present disclosure may also adopt a structure in which the diffusion layer 40 in FIG. 5 is replaced by the bulk diffusion film 50 in FIG. 6.

Figure 7:
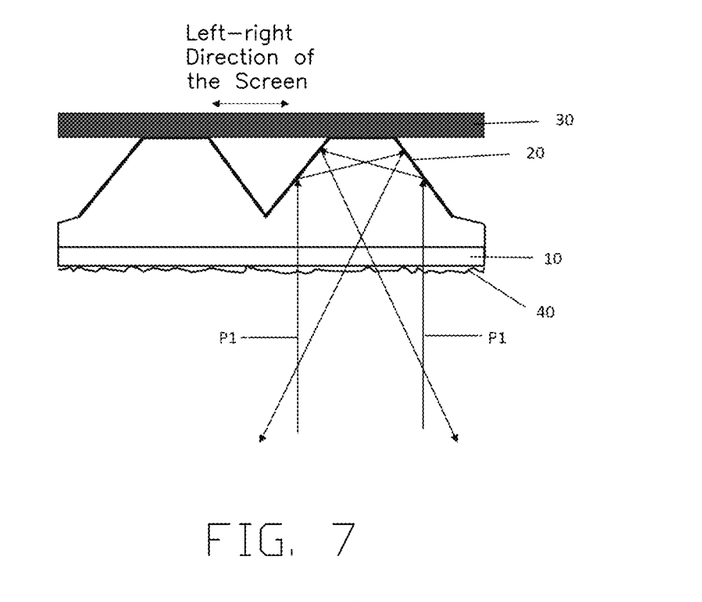
FIG. 7 shows an optical path of the projection light from the projector in a trapezoidal micro-structure.
Figure 8:
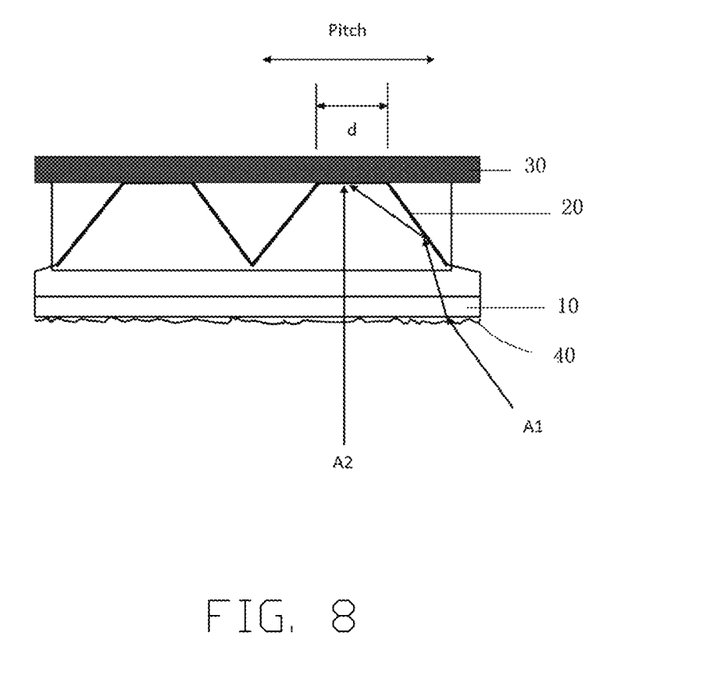
FIG. 8 is a cross-sectional view showing a state in which ambient light is incident on the projection screen shown in FIG. 2.
Figure 9:
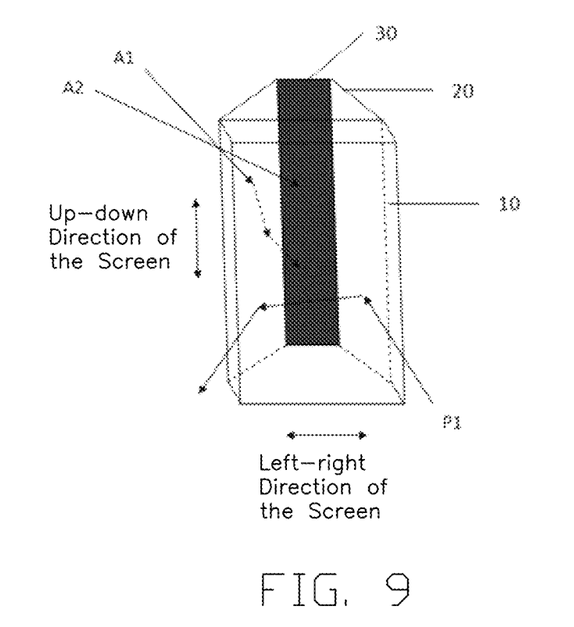
FIG. 9 is a perspective view showing the state in which ambient light is incident on the projection screen shown in FIG. 2.

In the following text, taking the structure of the projection screen shown in FIG. 2 as an example, the principle that the structure of the projection screen in the present disclosure can improve the contrast of ambient light will be explained in conjunction with FIGS. 8-9, FIG. 7 shows that projection light P1 from the far focus projector is incident on the screen in a direction approximately perpendicular to a screen plane. The screen plane is a plane composed of the up-down direction and the left-right direction of the screen.

The projection light P1 from the projector is totally internally reflected on the two inclined surfaces of each of the trapezoidal micro-structures of the total internal reflection layer 20, and the outgoing light reflected by the two inclined surfaces returns to the viewer side in a form of crossing with each other, thereby expanding a horizontal viewing angle. In addition, the diffusion layer 40 can further diffuse the emitted light, thereby further expanding the viewing angle.

Therefore, with the trapezoidal micro-structures in the total reflection layer 20 of the present disclosure, angles of the projection light from the projector can be expanded by the two inclined surfaces, so that the outgoing light of the projection light have large diffusion angles in the horizontal direction, and small diffusion angles in the vertical direction. In addition, the diffusion layer 40 can further expand the angles of the outgoing light.

By adopting the total internal reflection layer 20 in combination with the trapezoidal micro-structures and the diffusion layer 40, the present disclosure can effectively expand the viewing angle of the screen.

FIG. 8 is a cross-sectional view showing a state in which ambient light is incident on the projection screen shown in FIG. 2. FIG. 9 is a stereogram showing the state in which ambient light is incident on the projection screen shown in FIG. 2.

As shown in FIGS. 8 and 9, a part of the ambient light A2 is directly incident on a horizontal surface of one trapezoidal micro-structure of the total internal reflection layer 20 that is in contact with the black light absorbing layer 30, and is absorbed by the black light absorbing layer 30. Another part of the ambient light A1 is not directly incident on the horizontal surface of the total internal reflection layer 20 that is in contact with the black light absorbing layer 30, but incident on the inclined surfaces of the trapezoidal micro-structure of the total internal reflection layer 20, and then is incident on the horizontal surface of the trapezoidal micro-structure that is in contact with the black light absorbing layer 30 after being totally internally reflected by the inclined surfaces, and is absorbed by the black light absorbing layer 30. In addition, a part of the projection light exits toward the bottom surface after being totally internally reflected by the inclined surfaces of the trapezoidal micro-structures.

According to FIG. 8 and FIG. 9, it can be seen that the ambient light A2 perpendicular to the screen plane is directly absorbed by the black light absorbing layer 30, while the ambient light A1 deviating from a normal of the screen plane is absorbed by the black light absorbing layer 30 after being totally internally reflected by the inclined surfaces of one of the trapezoidal micro-structures.

Therefore, the ambient light A1 with large angles can be absorbed by the black light absorbing layer 30 like the ambient light A2, and another part of the ambient light is totally internally reflected by the inclined surfaces of the trapezoidal micro-structures and then exit toward the bottom surface.

Therefore, in the present disclosure, considering the absorption of ambient light incident from multiple angles is considered, the trapezoidal micro-structures are adopted in the total internal reflection layer 20 so that the black light absorbing layer can absorb the ambient light incident from various angles, thereby more significantly improving the screen contrast.

As shown in the cross-sectional view in FIG. 8, a length of a horizontal side of one of the trapezoidal micro-structures adjacent to the black light absorbing layer 30 is defined as d, and a pitch of the micro-structures is defined as Pitch. That is, in the cross-sectional view, a length of an upper bottom side of a trapezoid in one of the trapezoidal micro-structures is d, and a length of a lower bottom side of the trapezoid is Pitch. Aperture ratio is defined as:

Aperture ratio=$d$/Pitch.

Figure 10:
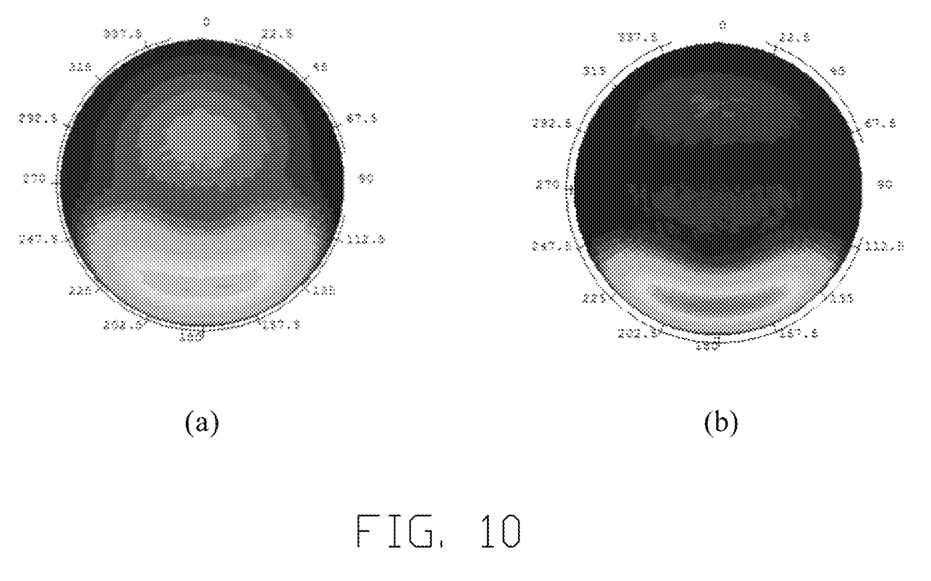
FIGS. 10a and 10l show simulation results of reflected light distribution of ambient light under different aperture ratios.

Next, referring to FIGS. 10*a* and 10*b*, results obtained by simulating the reflected light distribution of ambient light under different aperture ratios are described. In FIG. 10*a*, if the aperture ratio is set to 0, the total internal reflection layer 20 has triangular micro-structures. In FIG. 10*b*, if the aperture ratio is set to be greater than 0, the total internal reflection layer 20 has trapezoidal micro-structures.

As shown in FIG. 10*a*, in the case that the total internal reflection layer 20 has triangular micro-structures, most of the ambient light is intensively distributed in a cashew-shaped area below the vertical screen, which is a result of the ambient light reflected towards the bottom surface after multiple reflections on the two inclined surfaces of each micro-structure. However, in the case of adopting triangular micro-structures, some ambient light still exists in the direction perpendicular to the screen plane, that is, in field of view facing the viewers. As shown in FIG. 10*b*, the light in the direction perpendicular to the screen is significantly reduced after increasing the aperture ratio.

Figure 11:
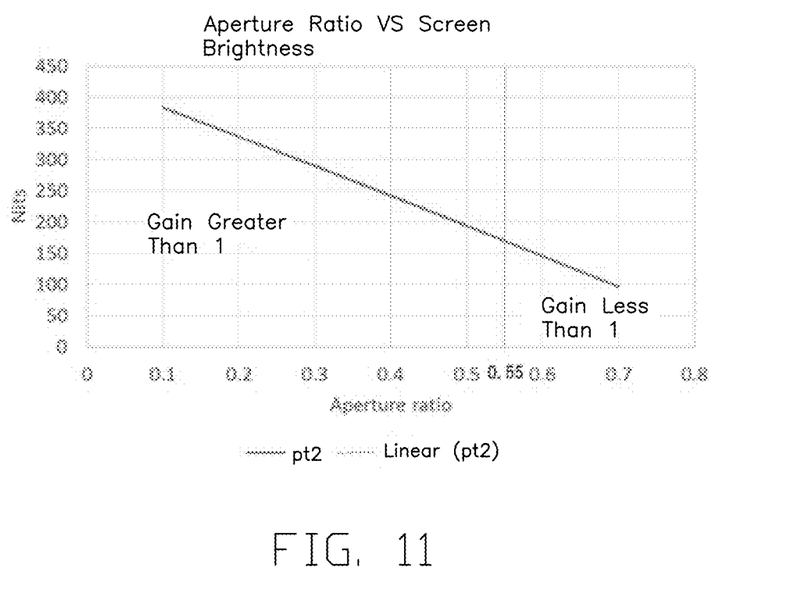
FIG. 11 shows the simulation results of screen brightness changes under different aperture ratios.

FIG. 11 shows the simulation results of the screen brightness changes under different aperture ratios. As shown in FIG. 11, if the aperture ratio is less than 0.55, a screen gain is greater than 1. The screen gain of 1 is equivalent to a Lambertian brightness of 172 Nits. If the aperture ratio is greater than 0.55, the screen gain drops below 1. Therefore, although the total internal reflection layer 20 with trapezoidal micro-structures in the present disclosure may cause part of the projection light from the projector to be absorbed by the black light absorbing layer 30, resulting in a decrease in screen gain, the present disclosure can significantly improve the anti-ambient light contrast of the projection screen while ensuring the screen gain by reasonably setting the aperture ratio.

In the present disclosure, a numerical value of the aperture ratio can be set in a range from 0.05 to 0.9, preferably, in a range from 0.1 to 0.5.

Hereinafter, a schematic diagram of light paths for total internal reflection in projection screens with different trapezoidal micro-structures will be described with reference to FIGS. 12 and 13.

Figure 12:
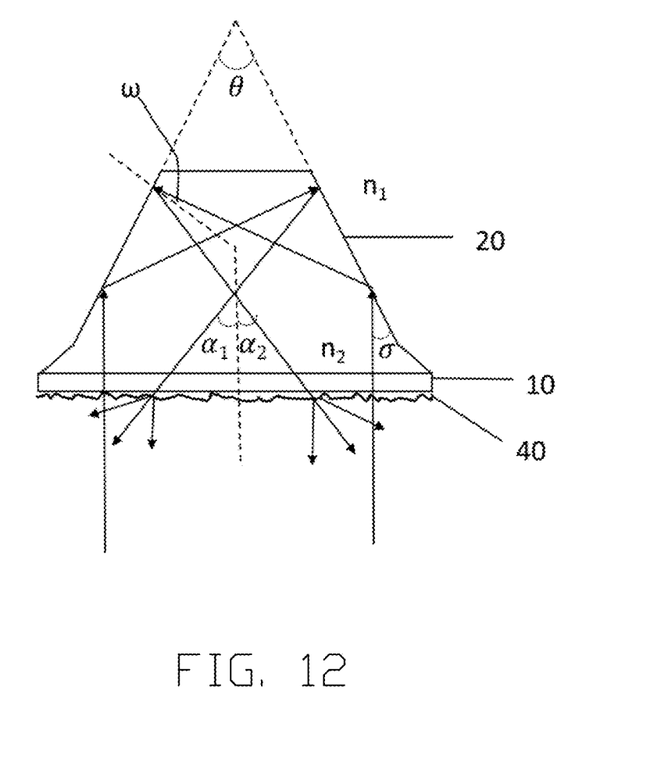
FIG. 12 is a cross-sectional view of a first structure of the trapezoidal micro-structure in the projection screen.

FIG. 12 is a cross-sectional view of a first structure of the trapezoidal micro-structure in the projection screen. In the first structural cross-sectional view, the angle θ between extension lines of the two inclined surfaces of the trapezoidal micro-structure of the total internal reflection layer 20 is an acute angle. Similar to the description of the structure in FIG. 2, since the projection light from the far focus projector and incident perpendicular to the screen plane is reflected on the two inclined surfaces in the total internal reflection layer 20, the reflected light is no longer parallel to the direction perpendicular to the screen plane. As a result, the total internal reflection layer 20 with trapezoidal micro-structures has an effect of diffusing the projection light.

In FIG. 12, an angle between the projection light and each of the inclined surfaces of the total internal reflection layer 20 is σ, and angles between the outgoing light after being reflected by the inclined surfaces and a normal direction perpendicular to the screen plane are $\alpha_1$ and $\alpha_2$, where $\alpha_1=\alpha_2$. An angle between the reflected light reflected by one inclined surface and a normal of the other inclined surface is ω, then it can be obtained according to geometric relationships shown in FIG. 12 that:

$$\omega = \frac{3}{2}\theta - 90.$$

$$\alpha_2 = 180 - 2\theta.$$

Assuming that a refractive index of a material outside the inclined surfaces of the total internal reflection layer 20 is $n_1$, and a refractive index of a material constituting the total internal reflection layer 20 is $n_2$, in order to satisfy total internal reflection condition, the following relationships need to be satisfied:

$$90 - \sigma \rangle \arcsin\left(\frac{n_1}{n_2}\right).$$

$$\omega \rangle \arcsin\left(\frac{n_1}{n_2}\right).$$

Therefore, the angle $\theta$ between the two inclined surfaces of the total internal reflection layer 20 must satisfy the following relationship:

$$\frac{2}{3}\left(90 + \arcsin\left(\frac{n_1}{n_2}\right)\right)\rangle\theta\langle180 - 2\arcsin\left(\frac{n_1}{n_2}\right)$$

The angle $\alpha_2$ between the reflected light and the normal direction perpendicular to the screen plane satisfies:

$$4\arcsin\left(\frac{n_1}{n_2}\right) - 180\langle\alpha_2\langle60 - \frac{4}{3}\arcsin\left(\frac{n_1}{n_2}\right).$$

Therefore, based on the refractive index $n_2$ of the material constituting the total internal reflection layer 20 and the refractive index $n_1$ of the material outside the inclined surfaces of the total internal reflection layer 20, a suitable angle $\theta$ between the two inclined surfaces of the trapezoidal total internal reflection layer 20 can be confirmed, and the diffusion angle obtained by the total internal reflection layer 20 can be calculated.

Figure 13:
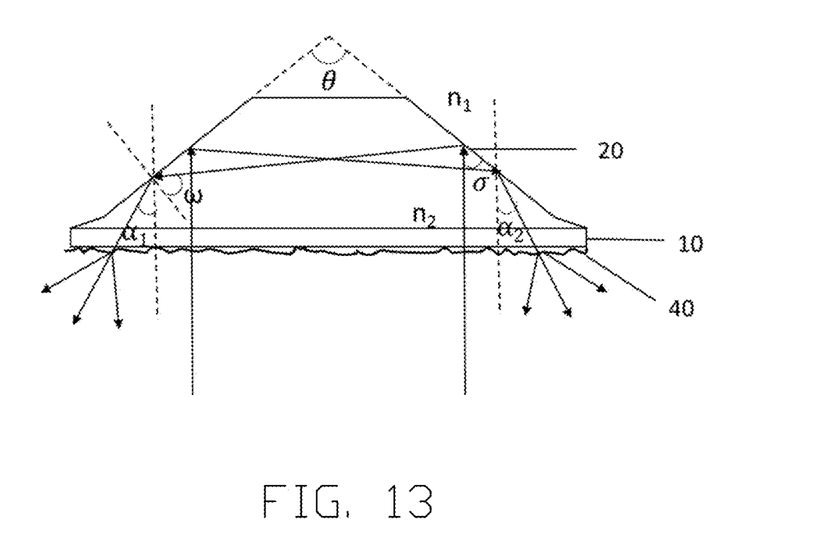
FIG. 13 is a cross-sectional view of a second structure of the trapezoidal micro-structure in the projection screen.

FIG. 13 is a cross-sectional view of a second structure of the trapezoidal micro-structure in the projection screen. In the second structural cross-sectional view, the angle $\theta$ between the extension lines of the two inclined surfaces of the trapezoidal micro-structure of the total internal reflection layer 20 is an obtuse angle. The same as the description of the structure in FIG. 2, since the projection light from the far focus projector and incident perpendicular to the screen plane is reflected on the two inclined surfaces of the total internal reflection layer 20, the reflected light is no longer parallel to the direction perpendicular to the screen plane. As a result, the total internal reflection layer 20 with trapezoidal micro-structures has the effect of diffusing the projection light.

In FIG. 13, the angle between the projection light and each of the inclined surfaces of the total internal reflection layer 20 is $\sigma$, and the angles between the emitted light reflected by the inclined surfaces and the normal direction of the vertical screen plane are $\alpha_1$ and $\alpha_2$, where $\alpha_1 = \alpha_2$. The angle between the reflected light reflected by one inclined surface and the normal of the other inclined surface is $\omega$, then it can be obtained according to geometric relationships shown in FIG. 13 that:

$$\alpha_1 = 2\theta - 180.$$

$$\omega = \frac{3}{2}\theta - 90.$$

Assuming that the refractive index of the material outside the inclined surfaces of the total internal reflection layer 20 is $n_1$, and the refractive index of the material constituting the total internal reflection layer 20 is $n_2$, in order to satisfy the total internal reflection condition, the following relationships need to be satisfied:

$$90 - \sigma \rangle \arcsin\left(\frac{n_1}{n_2}\right).$$

$$\omega \rangle \arcsin\left(\frac{n_1}{n_2}\right).$$

Therefore, the angle $\theta$ between the two inclined surfaces of the total internal reflection layer 20 must satisfy the following relationship:

$$\frac{2}{3}\left(90 + \arcsin\left(\frac{n_1}{n_2}\right)\right)\rangle\theta\langle180 - 2\arcsin\left(\frac{n_1}{n_2}\right).$$

The angle $\alpha_1$ between the emitted light and the normal direction perpendicular to the screen plane satisfies:

$$\frac{4}{3}\arcsin\left(\frac{n_1}{n_2}\right) - 60\langle\alpha_2\langle180 - 4\arcsin\left(\frac{n_1}{n_2}\right)$$

Therefore, based on the refractive index $n_2$ of the material constituting the total internal reflection layer 20 and the refractive index $n_1$ of the material outside the inclined surfaces of the total internal reflection layer 20, the angle $\theta$ between the two inclined surfaces of the trapezoidal total internal reflection layer 20 can be confirmed, and the diffusion angle obtained by the total internal reflection layer 20 can be calculated.

Figure 14:
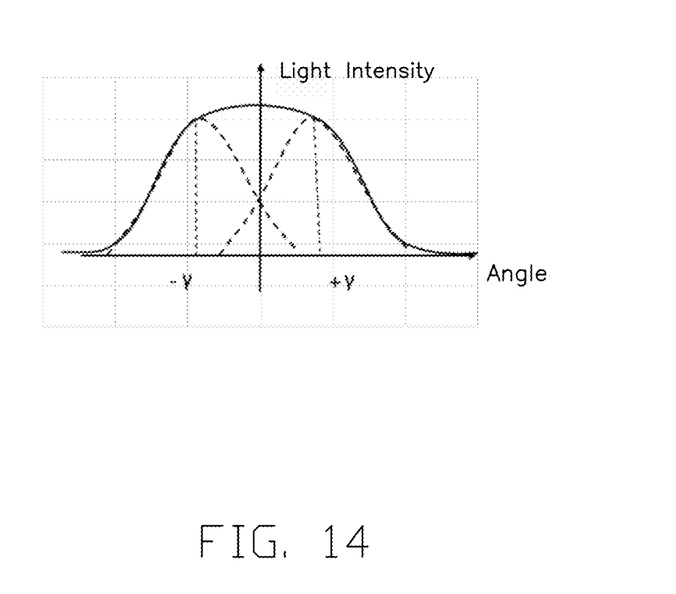
FIG. 14 shows a light intensity curve of the reflected light of the projection light.

FIG. 14 shows a light intensity curve of the projection light after being reflected by the two inclined surfaces of the total internal reflection layer 20. The projection light has a light intensity curve after being reflected by each of the inclined surfaces. As shown in FIG. 14, these two light intensity curves have a light intensity peak at $\pm\gamma$, respectively, and a new curve that changes with the angle of the emitted light is obtained after superposition, where $\gamma$ refers to the angles $\alpha1$ and $\alpha2$ between the emitted light reflected by the inclined surfaces and the normal direction perpendicular to the screen plane. The curve obtained after superposition shows the diffusion effect of the emitted light reflected by the two inclined surfaces. That is, the viewing angle of the projection screen is increased.

From the above description of the structure and principle of the projection screen of the present disclosure, it can be known that the projection screen of the present disclosure is used in conjunction with the far focus projector, so that the emitted light reflected by the total internal reflection layer has a diffusion angle. At the same time, the total internal reflection layer is used with diffusion materials such as a diffusion layer or a bulk diffusion film formed on the surface of the screen, which can effectively expand the viewing angle of the screen.

In addition, the trapezoidal micro-structure is used in the total internal reflection layer of the present disclosure, thereby taking into account the ambient light incident at multiple angles, so that the black light absorbing layer can absorb more ambient light, thereby more significantly improving the contrast of the screen.

It should be understood by those skilled in the art that various modifications, combinations, sub-combinations and changes can be made within the scope of the appended claims of the present disclosure or their equivalents according to design requirements and other factors.

What is claimed is:

1. A projection screen, comprising a substrate, a total internal reflection layer and a light absorbing layer for absorbing light, which are sequentially arranged in said order from a light incident side,
wherein the total internal reflection layer comprises a plurality of trapezoidal micro-structures extending in a vertical direction of the projection screen, the plurality of trapezoidal micro-structures is periodically arranged in a horizontal direction of the projection screen, and each of the plurality of trapezoidal micro-structures is in contact with the light absorbing layer.

2. The projection screen according to claim 1, wherein a cross section of each of the plurality of trapezoidal micro-structures has a shape of an isosceles trapezoid, a lower bottom side of the isosceles trapezoid faces the light incident side and an upper bottom side thereof faces the light absorbing layer, and a length of the lower bottom side is greater than a length of the upper bottom side.

3. The projection screen according to claim 1, further comprising a diffusion layer configured to diffuse light from the total internal reflection layer, wherein the diffusion layer and the total internal reflection layer are respectively formed on opposite surfaces of the substrate.

4. The projection screen according to claim 3, wherein the diffusion layer is formed by hot embossing or UV glue transfer.

5. The projection screen according to claim 3, wherein the substrate comprises a first substrate and a second substrate attached to each other, the total internal reflection layer is formed on the first substrate, and the diffusion layer is formed on a surface of the second substrate opposite to a surface of the second substrate to which the first substrate is attached to.

6. The projection screen according to claim 1, further comprising a diffusion layer configured to diffuse light from the total internal reflection layer, wherein the diffusion layer and the total internal reflection layer are respectively attached to opposite surfaces of the substrate.

7. The projection screen according to claim 1, further comprising a diffusion layer configured to diffuse light from the total internal reflection layer, wherein the substrate comprises a first substrate and a second substrate attached to each other, the total internal reflection layer is formed on the first substrate, and the diffusion layer is formed on a surface of the second substrate opposite to a surface of the second substrate to which the first substrate is attached.

8. The projection screen according to claim 1, wherein a ratio of a length of an upper bottom side to a length of a lower bottom side of each of the plurality of trapezoidal micro-structures of the total internal reflection layer is in a range of 0.05 to 0.9.

9. The projection screen according to claim 1, wherein the substrate comprises PET, PC, PVC, or PMMA.

10. The projection screen according to claim 1, wherein each of the plurality of trapezoidal micro-structures comprises two inclined surfaces and a horizontal surface in contact with a black light absorbing layer.

11. A projection system, comprising:
a projection screen, comprising a substrate, a total internal reflection layer and a light absorbing layer for absorbing light, which are sequentially arranged in said order from a light incident side, wherein the total internal reflection layer comprises a plurality of trapezoidal micro-structures extending in a vertical direction of the projection screen, the plurality of trapezoidal micro-structures is periodically arranged in a horizontal direction of the projection screen, and each of the plurality of trapezoidal micro-structures is in contact with the light absorbing layer; and
a far focus projector configured for emitting projection light from a light incident side toward the projection screen.

12. The projection system according to claim 11, wherein a cross section of each of the plurality of trapezoidal micro-structures has a shape of an isosceles trapezoid, a lower bottom side of the isosceles trapezoid faces the light incident side and an upper bottom side thereof faces the light absorbing layer, and a length of the lower bottom side is greater than a length of the upper bottom side.

13. The projection system according to claim 11, wherein the projection screen further comprises a diffusion layer configured to diffuse light from the total internal reflection layer, wherein the diffusion layer and the total internal reflection layer are respectively formed on opposite surfaces of the substrate.

14. The projection system according to claim 13, wherein the diffusion layer is formed by hot embossing or UV glue transfer.

15. The projection system according to claim 13, wherein the substrate comprises a first substrate and a second substrate attached to each other, the total internal reflection layer is formed on the first substrate, and the diffusion layer is formed on a surface of the second substrate opposite to a surface of the second substrate to which the first substrate is attached to.

16. The projection system according to claim 11, wherein the projection screen further comprises a diffusion layer configured to diffuse light from the total internal reflection layer, wherein the diffusion layer and the total internal reflection layer are respectively attached to opposite surfaces of the substrate.

17. The projection system according to claim 11, wherein the projection screen further comprises a diffusion layer configured to diffuse light from the total internal reflection layer, wherein the substrate comprises a first substrate and a second substrate attached to each other, the total internal reflection layer is formed on the first substrate, and the diffusion layer is formed on a surface of the second substrate opposite to a surface of the second substrate to which the first substrate is attached.

18. The projection system according to claim 11, wherein a ratio of a length of an upper bottom side to a length of a lower bottom side of each of the plurality of trapezoidal micro-structures of the total internal reflection layer is in a range of 0.05 to 0.9.

19. The projection system according to claim 11, wherein the substrate comprises PET, PC, PVC, or PMMA.

20. The projection system according to claim 11, wherein each of the plurality of trapezoidal micro-structures comprises two inclined surfaces and a horizontal surface in contact with a black light absorbing layer.

* * * * *